June 7, 1955  E. P. NOOYEN ET AL  2,710,034
STRAW CHOPPER HAVING COUNTER-ROTATING CUTTERS
Filed June 30, 1951

INVENTORS
EDWARD P. NOOYEN
WALTER J. NOOYEN
BY
ATTORNEY

United States Patent Office 2,710,034
Patented June 7, 1955

2,710,034

STRAW CHOPPER HAVING COUNTER-ROTATING CUTTERS

Edward P. Nooyen, Scott, and Walter J. Nooyen, Humbolt, Wis.

Application June 30, 1951, Serial No. 234,547

4 Claims. (Cl. 146—107)

This invention relates generally to straw choppers, and particularly to a straw cutter of the counter-rotation type wherein knife blades and coacting cutting-edges rotate in opposite directions.

The purpose of this invention is to provide a combined cutter and blower, concentrically disposed and rotating in opposite directions, for use with a threshing machine or combine, and coacting to chop the straw therefrom and blow said shortened straw and chaff into a suitable wagon.

It is an object of this invention to provide a straw chopper having counter-rotating cutting means concentrically related.

It is another object of this invention to provide a straw chopper having counter-rotating cutting means that is fed axially thereof.

It is still another object of this invention to provide a straw chopper having counter-rotating cutting means driven by driving means wholly on one side thereof.

It is yet another object of this invention to provide a straw chopper including blower vanes having one edge thereof serving as a cooperating cutting-edge.

It is a further object of this invention to provide a straw chopper that prevents the straw from hitting against a stationary or dead end wall, there being provided a revolving disc surface operable to aid in eliminating clogging.

It is still a further object of this invention to provide a straw chopper that is strong and durable, simple in construction, light in weight, relatively inexpensive to manufacture, easily and conveniently mounted on a combine, and otherwise well adapted for the purpose for which it is intended.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 2:
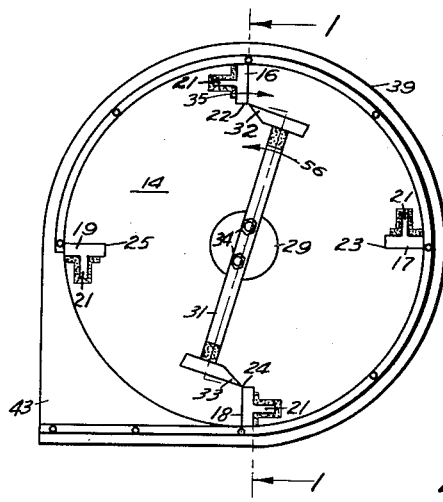
Fig. 2 is a front elevational view, with the cover removed, taken along line 2—2 of Fig. 1.
Figure 1:
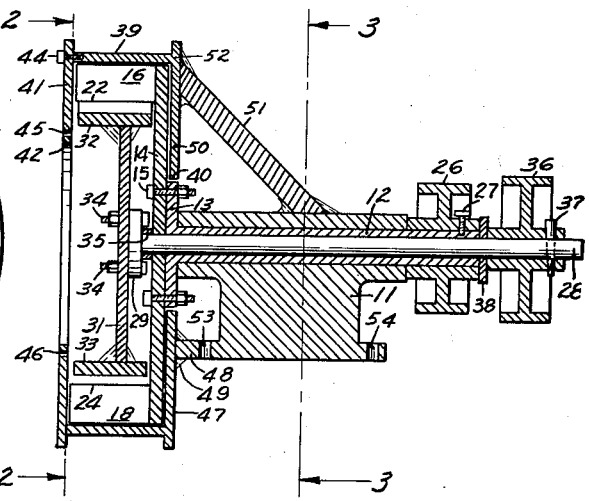
Fig. 1 is a longitudinal sectional view, taken along lines 1—1 of Fig. 2, of a preferred embodiment of the invention.
Figure 3:
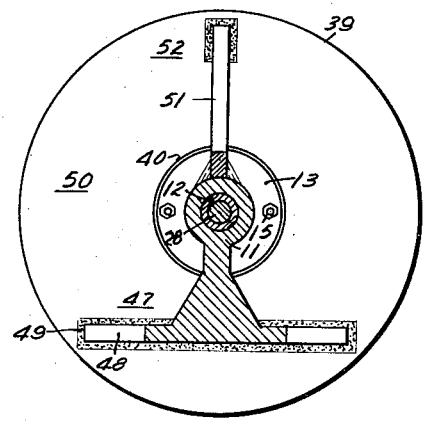
Fig. 3 is a sectional view taken along line 3—3 of Fig. 1.

Referring now to the drawings, wherein like reference characters designate like or corresponding parts throughout the several views, there is shown in Fig. 1 an elongated pedestal bearing 11 having a bore therethrough to receive a hollow shaft 12 adapted for rotation therein. The forward end of said hollow shaft is provided with a laterally projecting flange 13 to which is secured a centrally apertured disc 14 by means of equidistantly spaced bolts 15. Said disc comprises a first rotor, rotatable by said shaft through means of said flange.

Projecting laterally from the outer edge portion of the face of said disc 14 are quadrature spaced blower vanes 16, 17, 18 and 19, secured thereto as by welding. Said vanes are provided with strengthening brackets 21 welded to the vanes and disc to aid in resisting the operating forces acting on said vanes. The inboard edges 22, 23, 24 and 25 of the vanes 16, 17, 18 and 19, respectively, are adapted as cutting or shearing edges for coaction with revolving knives to be hereinafter described.

The opposite end of said hollow shaft 12 is provided with a driving pulley 26 connected rotatively-rigid therewith as by means of set screw 27.

It is to be noted that the pulley 26 and the flange 13 abut against the respective ends of elongated bearing 11 to prevent any longitudinal displacement of the hollow shaft 12 in the bearing 11.

A solid shaft 28, disposed in said hollow shaft 12 and adapted for rotation therein, is provided with a laterally projecting flange 29 at the forward end thereof to which is secured a diametral arm 31 carrying knife elements 32 and 33 on the terminals thereof. Said flange comprises a second rotor, rotatable by said shaft. Said diametral arm is secured to flange 29 through means of bolts 34; and said knife elements are secured to the arm terminals as by welding. The knife cutting edges are disposed to coact with the blower vane cutting edges to cut straw interposed therebetween. A spacing collar 35 is interposed between the flange 29 and the disc 14 to maintain proper operating clearance therebetween.

The opposite end of solid shaft 28 is provided with a driving pulley 36 secured thereto rotatively-rigid by means of pin 37. A spacing washer 38 is interposed between the oppositely rotatable driving pulleys. It is to be noted that the various members are juxtaposed to prevent any longitudinal displacement of the solid shaft 28, and to maintain proper operating clearances.

A blower casing 39 surrounds the blower end cutting mechanism, and is provided with a removable cover plate 41 having a central inlet opening 42 for axially feeding the straw into the blower and cutting means, and a tangential outlet opening 43 adapted to communicate with a stacker pipe or the like for discharging of the chopped straw. The cover 41 is removably attached by means of screws 44, and is also provided with bolt openings 45 and 46 for adaptation to a threshing machine or combine to receive the straw and chaff therefrom. The back wall 50 of the casing is centrally apertured as at 40 to receive the hollow shaft 12 and its flange 13.

The blower casing is secured in operative position by means of welding the lower portion 47 of its back plate to the extended base 48 of the pedestal bearing 11, as at 49. Additionally, bracket 51 is welded across the upper portion 52 of the back plate and the top portion of bearing 11, to further secure the blower casing.

Bolt openings 53 and 54 are provided in the base 48 of the bearing structure 11 to allow for attachment and mounting on the associated thresher or combined vehicle.

While the preferred embodiment discloses an oppositely rotating construction, it is obvious that either the knife or the cutting edge elements can be held fixed while the other is rotating, or the knife and the cutting edge can be rotated in the same direction at different speeds.

*Operation.*—The device as a whole is mounted on a vehicle such as a thresher or combine, by means of bolt connections through bolt holes 53 and 54, and disposed so that the inlet opening 42 communicates with the combine discharge to receive the straw and chaff therefrom.

The driving pulleys 26 and 36 can be driven by power take-off means from the combine, or they can be driven by independent power means. In either case, the fan mechanism is driven clockwise as indicated by arrow 55, and the knife mechanism counterclockwise as indicated by arrow 56.

As the straw is fed into the chopper it flows therein axially thereof, and is thrust centrifugally to the outer reaches of the chopper where the cutting means reduce it to short lengths and the blower vanes eject it through the tangential outlet opening 43 and up pipes or ducts for delivery into a wagon or for stacking it.

The counter-rotation of the fan means and the diametral knife arm 31 very effectively eliminates "slugging" or "choking" or "clogging" of the straw in the chopper. The diametral arm 31 drives and beats the straw in one direction, while the blower disc, counter revolving, tends to pull the straw in the opposite direction. As a result any accumulations or straw "bunches" are torn apart and uniformly dispersed throughout the chopper.

It is to be noted that the incoming straw does not hit against a stationary or dead back wall, there being provided a disc surface 14 that is rotating in the opposite direction operable to aid in preventing "clogging."

The characteristic features of this invention are to provide a straw chopper that has concentrically related counter-rotating cutting means; that has counter-rotating cutting means that is fed axially thereof; that has counter-rotating cutting means driven by driving means and supported by bearing means wholly on one side and externally thereof; that includes blower vanes having one edge thereof serving as a cooperating cutting edge; and that lacks the usual stationary or dead back wall, there being provided a revolving disc surface operable to aid in eliminating clogging.

Obviously many modifications and variations of the present invention are possible in the light of the above teaching. It is therefore to be considered, that within the scope of the appended claims, the invention may be practiced otherwise than as specifically described.

What is claimed and desired to be protected by Letters Patent of the United States is:

1. A straw chopper, comprising: a cylindrical housing having an axial inlet and a tangential outlet, and a central aperture in the back wall of said housing; a hollow shaft in said housing and extending through said aperture; bearing means for rotatably supporting said hollow shaft, disposed externally of said housing; a centrally apertured disc of substantially the same diameter as the housing disposed in said housing adjacent said back wall and mounted rotatively-rigid on said hollow shaft; fan vanes mounted on the outer edge portion of the face of said disc, the inboard edges of said vanes being cutting edges; a second shaft journalled in said hollow shaft and extending into said housing; a transverse arm mounted rotatively-rigid on said second shaft and disposed forwardly of said disc; knife blades mounted on the terminals of said diametral arm and disposed to coact with said cutting edges; and means for rotatably driving said hollow shaft and second shaft in opposite directions.

2. A straw chopper, comprising: a cylindrical blower housing having an axial inlet and a peripheral outlet; first rotor means in said housing; fan vanes mounted on said first rotor, said fan vanes being disposed on the rotor face confronting said inlet, an edge of said fan vanes being a cutting edge; second rotor means in said housing mounted coaxially with said first rotor, said second rotor being independently rotatable with respect to said first rotor; and knife elements mounted on said second rotor, said knife elements being disposed to coact with said cutting edges.

3. A straw chopper, comprising: a cylindrical blower housing having an axial inlet and a peripheral outlet; first disc rotor means in said housing; fan vanes mounted on said first disc rotor means, said fan vanes being disposed on the disc rotor face confronting said inlet, the inboard edges of said fan vanes being cutting edges; second rotor means in said cylindrical housing, mounted coaxially with said first disc rotor means, said second rotor being independently rotatable with respect to said first rotor; a radial arm carried by said second rotor; and a knife element mounted on said radial arm, said knife element being disposed to coact with said cutting edges.

4. A straw chopper, comprising: a cylindrical blower housing having an axial inlet and a tangential outlet; first disc rotor means in said cylindrical housing, mounted coaxially therewith, said disc rotor having substantially the same diameter as the inner diameter of said cylindrical housing; fan vanes mounted on said first disc rotor means, said fan vanes being disposed on the disc rotor face confronting said inlet, the inboard edges of said fan vanes being cutting edges; second rotor means in said cylindrical housing, mounted coaxially therewith, said second rotor being independently rotatable with respect to said first rotor; radial arms mounted on said second rotor and extending therefrom; and knife elements mounted on said radial arms, said knife elements being disposed to coact with said cutting edges.

References Cited in the file of this patent

UNITED STATES PATENTS

| | | |
|---|---|---|
| 273,237 | Johnston | Feb. 27, 1883 |
| 506,117 | Josselin | Oct. 3, 1893 |
| 1,614,409 | Surtees | Jan. 11, 1927 |
| 1,669,471 | Jones | May 15, 1928 |
| 2,283,834 | Van Dam et al. | May 19, 1942 |
| 2,283,865 | Cohen | May 19, 1942 |
| 2,416,043 | Bucher-Guyer | Feb. 18, 1947 |
| 2,546,860 | Klagsbrunn | Mar. 27, 1951 |

FOREIGN PATENTS

| | | |
|---|---|---|
| 13,951 | Great Britain | Oct. 21, 1884 |
| 157,374 | Great Britain | Dec. 1, 1921 |
| 593,871 | France | June 6, 1925 |